United States Patent
Watanabe et al.

(10) Patent No.: US 8,080,167 B2
(45) Date of Patent: Dec. 20, 2011

(54) SHAPING METHOD OF THIN FILM AND MANUFACTURING METHOD OF PERPENDICULAR RECORDING MAGNETIC HEAD USING THE SAME

(75) Inventors: Hisayoshi Watanabe, Tokyo (JP);
Toshiomi Yokoyama, Tokyo (JP);
Nobuyuki Mori, Tokyo (JP); Akihiro Kaneko, Tokyo (JP); Michitaka Nishiyama, Tokyo (JP); Kenji Yokoyama, Tokyo (JP)

(73) Assignee: TDK Corporation, Tokyo (JP)

( * ) Notice: Subject to any disclaimer, the term of this patent is extended or adjusted under 35 U.S.C. 154(b) by 333 days.

(21) Appl. No.: 12/389,688

(22) Filed: Feb. 20, 2009

(65) Prior Publication Data

US 2010/0213163 A1 Aug. 26, 2010

(51) Int. Cl.
*B44C 1/22* (2006.01)
(52) U.S. Cl. .......................... 216/22; 360/97.01; 216/75
(58) Field of Classification Search ................... None
See application file for complete search history.

(56) References Cited

U.S. PATENT DOCUMENTS

| | | | |
|---|---|---|---|
| 5,438,747 A | 8/1995 | Krounbi et al. | |
| 5,452,164 A | 9/1995 | Cole et al. | |
| 5,469,351 A | 11/1995 | Masrur et al. | |
| 2002/0090534 A1* | 7/2002 | Shirasaki et al. | 428/692 |
| 2004/0061092 A1* | 4/2004 | Brankovic et al. | 252/79.1 |
| 2005/0068665 A1* | 3/2005 | Le et al. | 360/97.01 |
| 2006/0098339 A1* | 5/2006 | Koyama et al. | 360/126 |
| 2008/0297953 A1 | 12/2008 | Matono et al. | |

FOREIGN PATENT DOCUMENTS

JP 2006-134507 5/2006
* cited by examiner

*Primary Examiner* — Binh X Tran
*Assistant Examiner* — David Cathey, Jr.
(74) *Attorney, Agent, or Firm* — Oblon, Spivak, McClelland, Maier & Neustadt, L.L.P.

(57) ABSTRACT

The present invention relates to a shaping method of a thin film layer and a manufacturing method of a perpendicular recording magnetic head using the same. In the thin film layer shaping method according to the present invention, since a second thin film of a lower etching rate is etched by a preliminary etching amount allowing for a difference between the etching rate of the second thin film and an etching rate of a first thin film in side-by-side relationship with each other, both the first and second thin films can be etched by the same etching amount through a subsequent etching step, so that the thin film layer can be shaped into a given shape. Thus, the surface of the thin film layer can be planarized.

11 Claims, 12 Drawing Sheets

SHAPING METHOD OF THIN FILM AND MANUFACTURING METHOD OF PERPENDICULAR RECORDING MAGNETIC HEAD USING THE SAME

TECHNICAL FIELD

The present invention relates to a shaping method of a thin film layer and a manufacturing method of a perpendicular recording magnetic head using the same.

BACKGROUND OF THE INVENTION

In the field of magnetic heads to be mounted on a magnetic recording apparatus such as a hard disk drive (HDD), recently, the recording method is being shifted from longitudinal recording to perpendicular recording in order to improve the recording density with respect to a magnetic recording medium such as a hard disk. The perpendicular recording method provides not only a high linear recording density but also an advantage that the recording medium after recording is less influenced by thermal fluctuation.

In the magnetic head according to the perpendicular recording method, when the drive system is a rotary actuator, generally, a recording medium facing surface of a main magnetic pole has an inverted trapezoidal shape whose longer and shorter sides are located on trailing and leading sides, respectively, or an inverted triangular shape whose base is located on a trailing side for avoiding the problem of side erase, wherein the longer side or the base is defined as a track width of the main magnetic pole. It should be noted that the "side erase" refers to a problem that a skew angle between a central axis of the magnetic head and a line tangent to a track of a magnetic disk being the recording medium increases at radially inner and outer sides of the magnetic disk, and as a result, the leading side of the main magnetic pole partially protrudes into an adjacent track, thereby erasing information recorded on the track.

For formation of the main magnetic pole, generally, there has been employed a manufacturing method using dry etching by ion milling. In the ion milling, the main magnetic pole film may be shaped into a given shape by changing an irradiation angle of an ion beam on demand, but in this case, since a small-width portion whose section has the inverted trapezoidal or triangular shape is disposed in side-by-side relationship with a non-magnetic film such as of alumina and the main magnetic pole film has a higher etching rate, the main magnetic pole film is etched more at a central area which is less protected by the non-magnetic film, causing a problem that the inverted trapezoidal or triangular shape is recessed at the trailing side (i.e., at the longer side or the base) into an arc shape.

Contrarily, for example, US Unexamined Patent Application Publication No. 2006/0098339 (Japanese Unexamined Patent Application Publication No. 2006-134507) discloses a technology of purposefully forming an arcuate recess at the trailing side of the inverted trapezoidal shape. This technology can control the radius of curvature of the recess with a high accuracy and thus will never cause a problem, but in the case where the above technology cannot be employed on account of the manufacturing process of the magnetic head and the recess is formed without any purpose as described above, the recess becomes inaccurate, which is totally undesirable because it leads to unevenness in the inverted trapezoidal or triangular shape.

Since the above problem occurs when forming a thin film layer including a plurality of thin films having different etching rates, it is not typical of the manufacturing process of the magnetic head but also unavoidable in the manufacturing process of other electronic component elements such as an integrated circuit as long as having such a thin film layer structure.

SUMMARY OF THE INVENTION

It is an object of the present invention to provide a shaping method of a thin film layer which enables planarization of the surface of the thin film layer and a manufacturing method of a perpendicular recording magnetic head using the same.

In order to solve the above problem, the thin film layer shaping method according to the present invention includes a preliminary etching step and an etching step. It should be noted that the thin film layer includes a first thin film and a second thin film in side-by-side relationship with the first thin film.

(1-1) Preliminary Etching Step

A preliminary etching amount is calculated, based on a required etching amount for shaping the first thin film into a given shape, an etching rate of the first thin film, and an etching rate of the second thin film, for compensating for a difference between the etching rates to equalize an etching amount of the second thin film to the required etching amount, and only the second thin film is etched by the preliminary etching amount.

(1-2) Etching Step

The thin film layer is etched by the required etching amount.

According to the shaping method, since the second thin film is preliminarily etched at the preliminary etching step by the preliminary etching amount allowing for the difference between the etching rates of the first and second thin films, both the first and second thin films can be etched by the required etching amount through the subsequent etching step.

Therefore, since the first and second thin films can be etched by the same amount, the surface of the thin film layer can be planarized.

A typical example of the application of the thin film layer shaping method according to the present invention is a manufacturing method of a perpendicular recording magnetic head. The perpendicular recording magnetic head manufacturing method includes a magnetic pole layer forming step, a preliminary etching step and an etching step.

(2-1) Magnetic Pole Layer Forming Step

A magnetic pole layer is formed to include a main magnetic pole film and a non-magnetic film in side-by-side relationship with the main magnetic pole film.

(2-2) Preliminary Etching Step

A preliminary etching amount is calculated, based on a required etching amount for shaping the main magnetic pole film into a given shape, an etching rate of the main magnetic pole film, and an etching rate of the non-magnetic film, for compensating for a difference between the etching rates to equalize an etching amount of the non-magnetic film to the required etching amount, and only the non-magnetic film is etched by the preliminary etching amount.

(2-3) Etching Step

The magnetic pole layer is etched by the required etching amount.

According to the manufacturing method, since the above effect can be obtained, the main magnetic pole film and the non-magnetic film can be etched by the same amount and the trailing side of the main magnetic pole can be planarized.

The other objects, constructions and advantages of the present invention will be further detailed below with reference to the attached drawings. However, the attached drawings show only illustrative examples.

DESCRIPTION OF THE PREFERRED EMBODIMENTS

First will be described a thin film layer shaping method according to the present invention, next will be described the structure of a magnetic head that is to be manufactured by a perpendicular recording magnetic head manufacturing method according to the present invention, and finally, the perpendicular recording magnetic head manufacturing method according to the present invention will be described.

1. Thin Film Layer Shaping Method

Figure 1A:
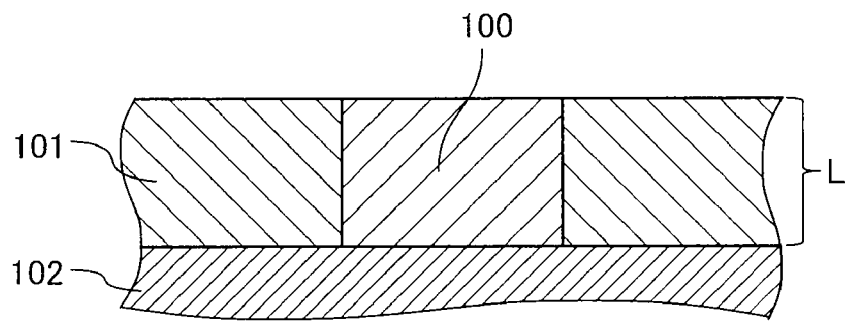
FIGS. 1(a) to 1(c) are cross-sectional views of a thin film layer at respective steps of a thin film layer shaping method according to the present invention.
Figure 1B:
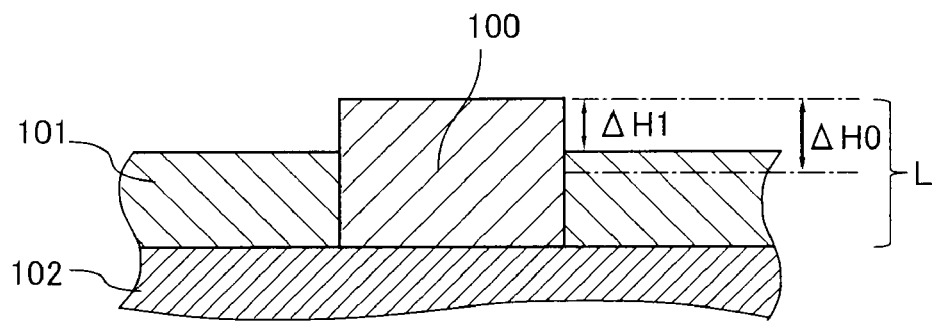
Figure 1C:
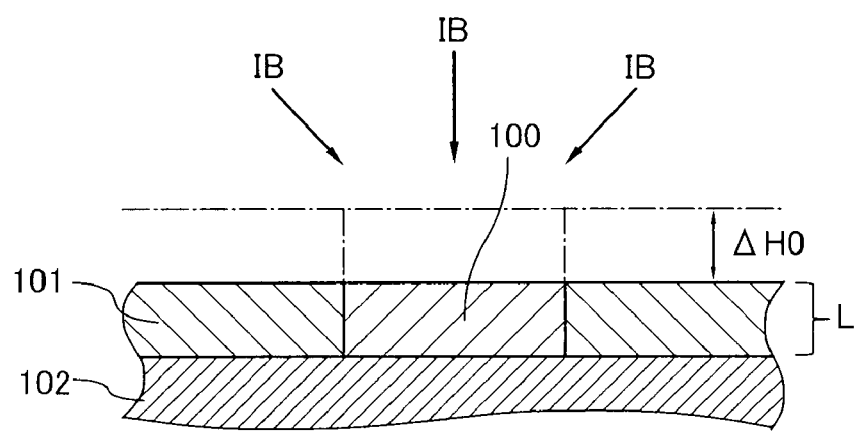

FIGS. 1(a) to 1(c) are cross-sectional views of a thin film layer at respective steps of a thin film layer shaping method according to the present invention. The thin film layer shaping method according to the present invention includes a preliminary etching step and an etching step. As shown in FIG. 1(a), a thin film layer L is formed on a support 102 by sputtering or plating and includes a first thin film 100 and a second thin film 101 in side-by-side relationship with the first thin film 100.

At the preliminary etching step, as shown in FIG. 1(b), a preliminary etching amount $\Delta H1$ is calculated, based on a required etching amount $\Delta H0$ for shaping the first thin film 100 into a given shape, an etching rate ER1 of the first thin film 100, and an etching rate ER2 of the second thin film 101, for compensating for a difference between the etching rates ER1, ER2 to equalize an etching amount of the second thin film 101 to the required etching amount $\Delta H0$, and only the second thin film 101 is etched by the preliminary etching amount $\Delta H1$.

The required etching amount $\Delta H0$ refers to a depth to which the second thin film 101 is removed when the thin film layer L is shaped into a given shape at the following etching step. On the other hand, the etching rates ER1, ER2 refer to depths to which the first and second thin films 100, 101 are removed by etching per unit time, respectively. Here, the second thin film 101 is more difficult to etch than the second thin film 101, satisfying the etching rate relation of ER1>ER2.

With the above parameters, the preliminary etching amount $\Delta H1$ is calculated by $$\Delta H1 = \Delta H0 * \{1-(ER2/ER1)\} \quad \text{(formula 1)}.$$

In the case of the milling rate ER1:ER2=2:1 and the required etching amount $\Delta H0$=0.006 (μm), for example, the preliminary etching amount $\Delta H1$=0.003 (μm). In the case of the milling rate ER1:ER2=4:1 and the required etching amount $\Delta H0$=0.008 (μm), on the other hand, the preliminary etching amount $\Delta H1$=0.006 (μm).

Since etching at the preliminary etching step should be performed only on the second thin film 101, when employing an etching process, it is required to select a process that will not act on the first thin film 100 but effectively act only on the second thin film 101. As a typical example, it is possible to employ an etchant that will act only on the second thin film 101. However, other etching processes such as reactive ion etching may also be employed as long as only the second thin film 101 can be etched by the process without affecting the first thin film 100.

At the next etching step, as shown in FIG. 1(c), the thin film layer L is etched by the required etching amount $\Delta H0$. At this time, for example, ion milling can be employed as an etching process. Ion milling is performed by irradiating an ion beam IB on the thin film layer L while changing its irradiation angle, whereby the first and second thin films 100, 101 can be shaped into a given shape.

According to this shaping method, since the second thin film 101 is preliminarily etched at the preliminary etching step by the preliminary etching amount $\Delta H1$ allowing for the difference between the etching rates ER1, ER2 of the first and second thin films 100, 101, both the first and second thin films 100, 101 can be etched by the required etching amount $\Delta H0$ through the subsequent etching step.

Therefore, since the first and second thin films 100, 101 can be etched by the same amount, the surface of the thin film layer L can be planarized.

The first thin film 100 can be planarized with a higher accuracy, if necessary, by performing a planarization process on the first thin film 100 after the etching step.

A typical example of the application of the thin film layer shaping method according to the present invention is a manufacturing method of a perpendicular recording magnetic head. Next will be described an example of a magnetic head to which the manufacturing method is applicable.

2. Magnetic Head

Figure 2:
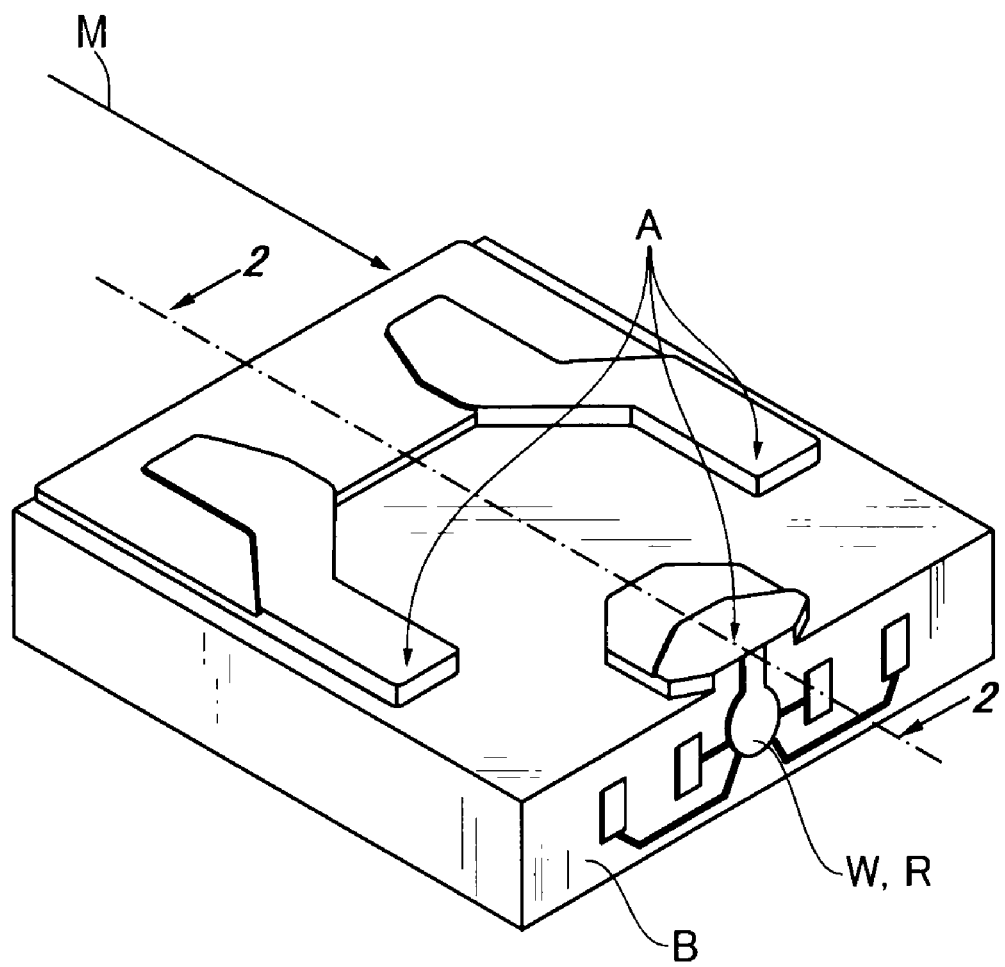
FIG. 2 is a perspective view of a magnetic head to which a perpendicular recording magnetic head manufacturing method according to the present invention is applicable.
Figure 3:
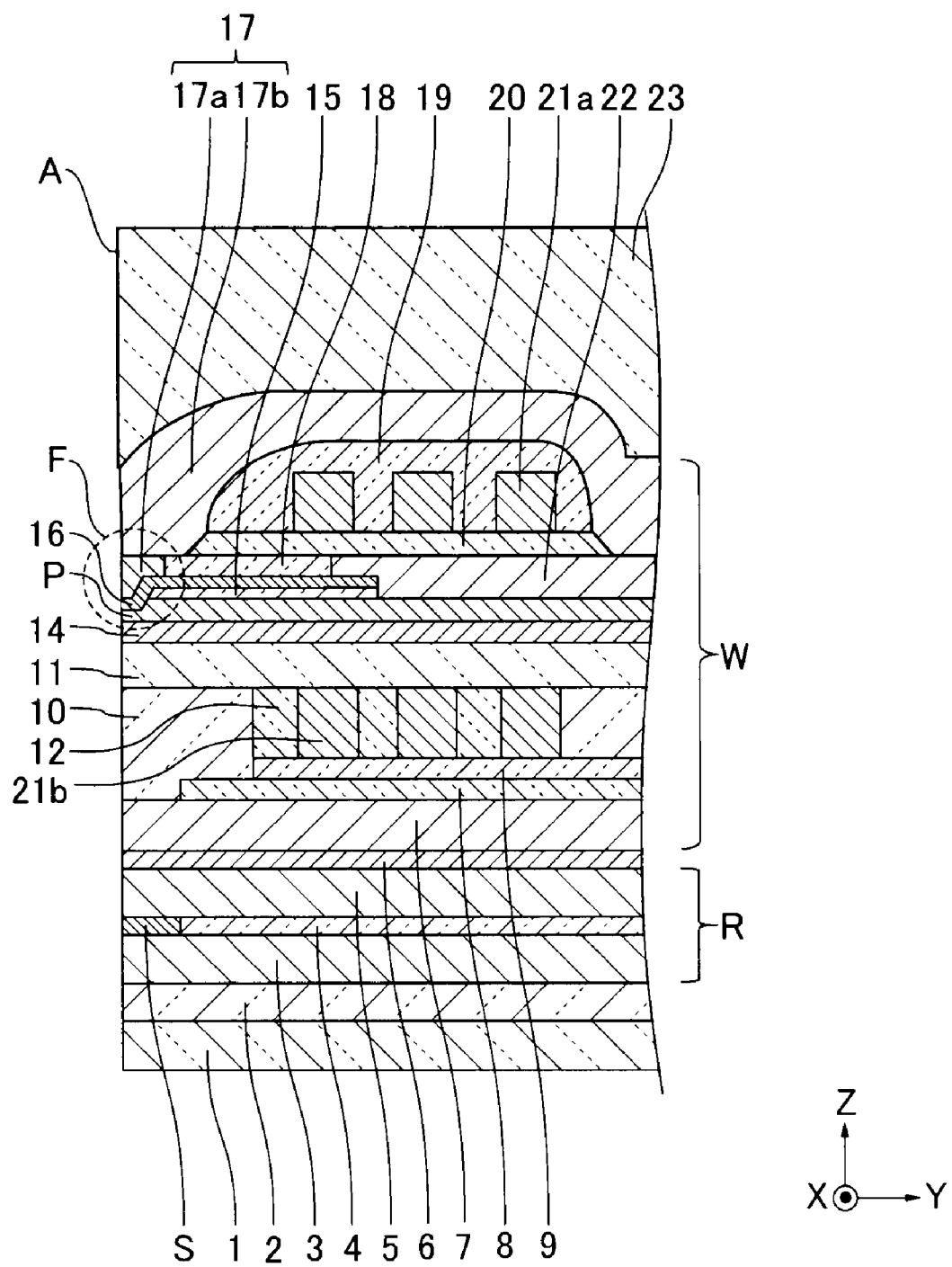
FIG. 3 is a partial cross-sectional view taken along line 2-2 in FIG. 1.
Figure 4:
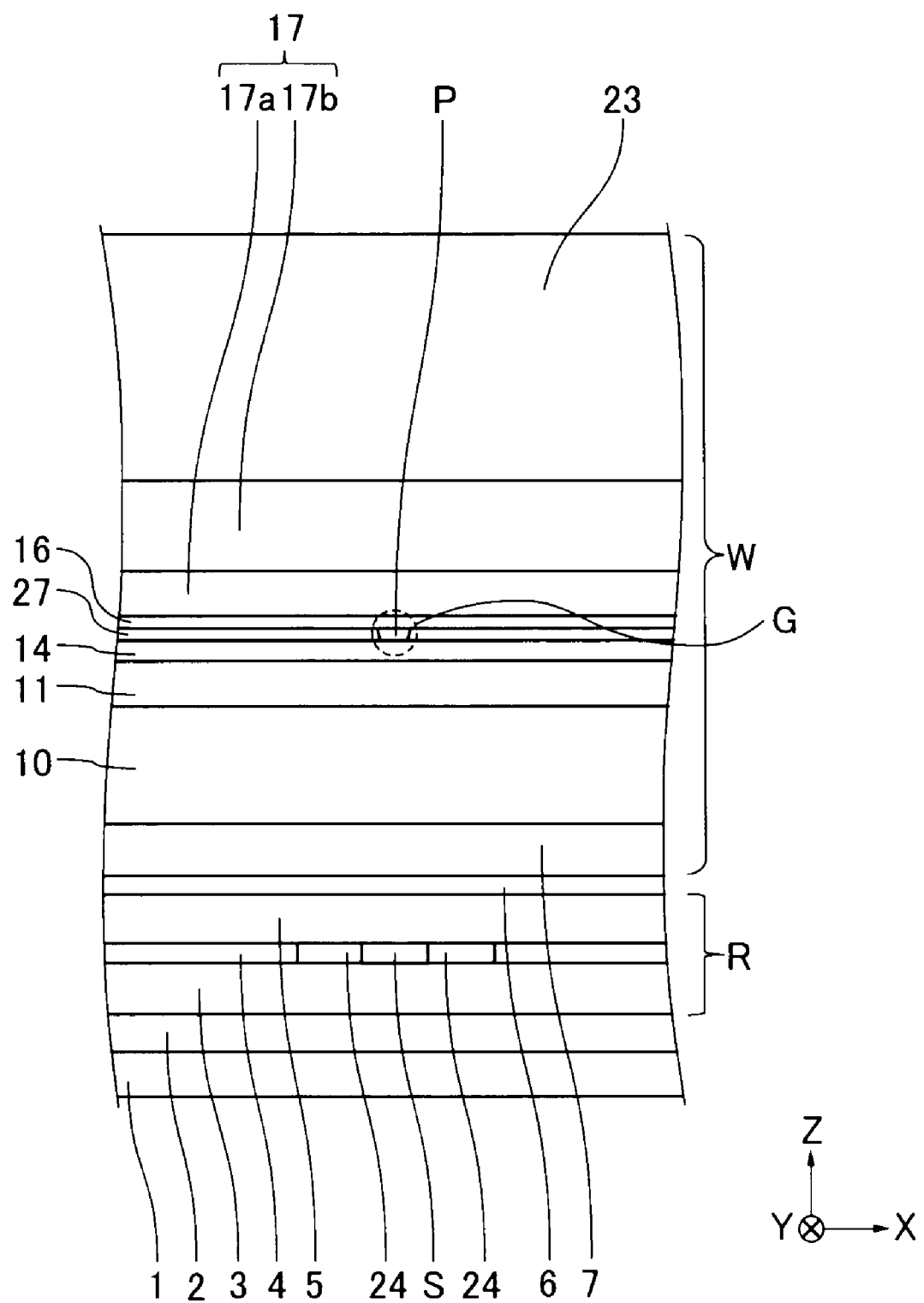
FIG. 4 is an end view of a recording medium facing surface of a recording/reproducing head.

FIGS. 2 to 4 show a magnetic head to be used in combination with a rapidly spinning magnetic recording medium, for example, a hard disk. Such a magnetic head is generally called floating-type.

Referring first to FIG. 1, the magnetic head has a slider substrate B with a generally rectangular prism structure. The slider substrate B has an air bearing surface A, which directly relates to floating characteristics, with a recording/reproducing head (W, R) disposed on a side end surface that is located at an air flow-out end (trailing edge) side with respect to an air flow direction M.

First of all, the structure of the recording/reproducing head (W, R) will be described with reference to FIGS. 2 and 3. It should be noted that FIG. 3 is a partial cross-sectional view taken along line 2-2 in FIG. 1, and FIG. 4 is an end view of the recording medium facing surface A (air bearing surface A) of the recording/reproducing head (W, R).

In the following description, dimensions along the X, Y and Z axes shown in the drawings are called "width", "length" and "thickness/height", respectively. Along the Y axis, moreover, sides close to and remote from the recording medium facing surface A are designated by "front" and "rear", respectively.

The magnetic head according to the present embodiment is a composite-type head which can perform both recording and reproducing. The magnetic head is formed such that an insulating film 2, a reproducing head R using magneto-resistive effect (MR), a separating film 6, a recording head W for performing a recording process in a perpendicular recording method, and an overcoat film 23 are stacked on a substrate 1 in the mentioned order.

The reproducing head R is formed by stacking a lower read shield film 3, a shield gap film 4, and an upper read shield film 5 in the mentioned order. In the shield gap film 4, an MR element S is embedded to appear on the recording medium facing surface A.

Both the lower read shield film 3 and the upper read shield film 5 function to magnetically separate the MR element S from the surroundings and extend rearward from the recording medium facing surface A. The upper read shield film 5 and the lower read shield film 3 are made of a magnetic material such as a nickel-iron alloy (NiFe). On the other hand, the shield gap film 4 functions to electrically separate the MR element S from the surroundings and is made of a non-magnetic insulating material such as alumina.

The MR element S is an element having giant magneto-resistive effect (GMR) or tunneling magneto-resistive effect (TMR). As shown in FIG. 4, two bias magnetic field applying films 24 are disposed adjacent two sides of the MR element S with an insulating film interposed therebetween.

The recording head W has a magnetic film 7, an insulating films 8-12, 18-20, coils 21a, 21b, a first gap film 14, a second gap film 16, a main magnetic pole film P, a first non-magnetic film 15, a second non-magnetic film 27, a shield film 17, and a yoke film 22.

The coils 21a, 21b are in a spiral shape and generate a recording magnetic field corresponding to information to be recorded on a recording medium. The first coil 21a is enclosed by the insulating film 19, which also fills up the space between the winding, while the insulating film 12 fills up the space between the winding of the second coil 21b, which is further enclosed by the insulating film 10. The insulating layer 10 is made of alumina or the like, while the insulating films 12, 19 are formed by a photoresist or the like. On the trailing side of the second coil 21b, moreover, there is also disposed the insulating film 11, which is made of an insulating material such as alumina.

The main magnetic pole film P is a multi-layer magnetic material film extending rearward from the recording medium facing surface A and disposed in side-by-side relationship with the second non-magnetic film 27, as shown in FIG. 4, and the recording medium facing surface A has an inverted trapezoidal shape, in which the longer side on the trailing side and the shorter side on the leading side are taken as an upper base and a lower base, respectively. The upper side of the inverted trapezoidal shape is a substantial recording portion of the main magnetic pole film P, and its width defines the recording track width. In general, the recording track width is approximately 0.2 μm or less.

The main magnetic pole film P permits passage of a magnetic flux corresponding to a recording magnetic field generated by the coils 21a, 21b, thereby recording information on a recording medium in a perpendicular magnetic recording method.

Figure 5:
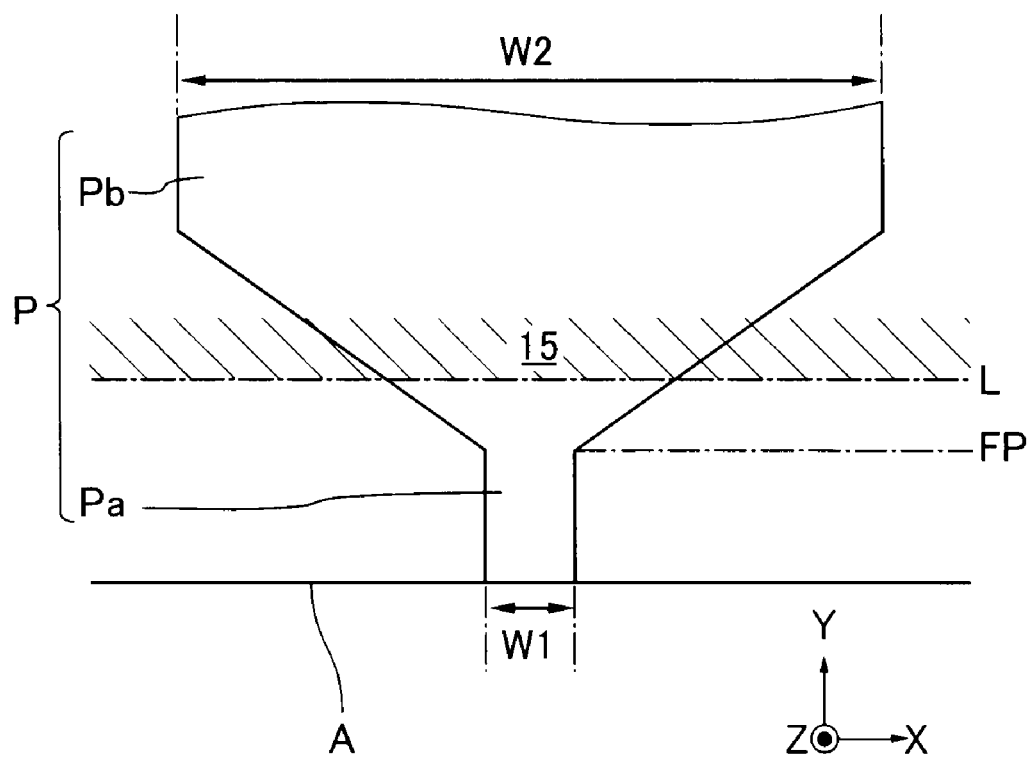
FIG. 5 is a plan view showing a portion of a main magnetic pole film in the vicinity of the recording medium facing surface.

FIG. 5 is a plan view showing a portion of the main magnetic pole film P in the vicinity of the recording medium facing surface A. The main magnetic pole film P includes a small-width portion Pa extending rearward from the recording medium facing surface A and a large-width portion Pb continuous with the rear of the small-width portion Pa.

The small-width portion Pa is a substantial magnetic flux emitting portion and has a constant width W1, wherein the width W1 defines the foregoing recording track width. The large-width portion Pb is a portion intended to supply a magnetic flux to the small-width portion Pa and has a width W2 larger than the width W1. The width of the large-width portion Pb gradually decreases in its front portion toward the small-width portion Pa. The position where the width of the main magnetic pole film P starts to increase from the width W1 to the width W2 is a so-called flare point FP. The height of the main magnetic pole film P varies between the flare point FP and a line L that defines an end of the first non-magnetic film 15 covering the top of the large-width portion Pb.

Figure 6:
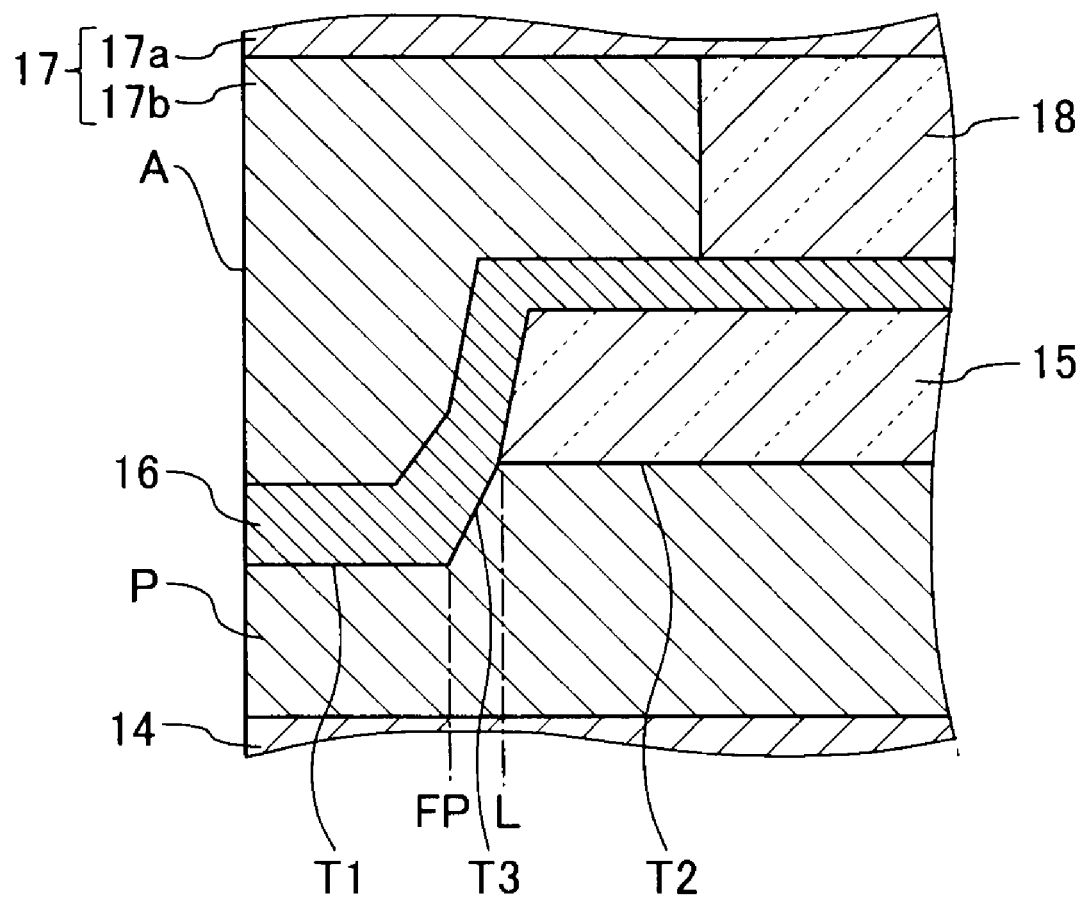
FIG. 6 is an enlarged view of an area indicated by a symbol F in FIG. 2.

FIG. 6 is an enlarged view of an area indicated by a symbol F in FIG. 2. The main magnetic pole film P has first and second surfaces T1, T2 that are located at different levels and a third surface T3 that is a slope connecting these surfaces T1, T2. It should be noted that the boundary between the first and third surfaces T1, T3 is located at the flare point TP, while the boundary between the third and second surfaces T3, T2 is located at the defining line L.

The first surface T1 extends rearward from the recording medium facing surface A, while the second surface T2 extends behind the first surface T1 and is located more distant from the substrate 1. This decreases the thickness of the small-width portion Pa at the recording medium facing surface A, preventing the occurrence of the problem due to skew and also providing an effect that much magnetic flux can be introduced into the recording medium facing surface A.

With the first non-magnetic film 15 disposed on the second surface T2, the main magnetic pole film P is electrically and magnetically separated from the surroundings. The first non-magnetic film 15 is made of an inorganic insulating material such as alumina or $SiO_2$ or a metallic material such as Ru or Ti.

Moreover, the second non-magnetic film 27 shown in FIG. 4 is disposed in side-by-side relationship with the main magnetic pole film P in the X-axis direction for electrically and magnetically separating the main magnetic pole film P from the surroundings and made of a non-magnetic insulating material such as alumina.

The first gap film 14 and the second gap films 16, which are made of a non-magnetic material and have an end face on the recording medium facing surface A, are disposed between the insulating film 11 such as of alumina and the main magnetic pole film P and between the shield film 17 and the main magnetic pole film P, respectively.

The shield film 17, which is made of a magnetic material and bears the function of circulating the magnetic flux, has an end face disposed forward in a moving direction of a recording medium with respect to the end face of the main magnetic pole film P on the recording medium facing surface A. The shield film 17 has a first layer 17a disposed adjacent the second gap film 16 and a second layer 17b connected to the first layer 17a on the side opposite from the second gap film 16. The second layer 17b is connected to the yoke film 22 disposed behind the first layer 17a through the insulating film 18 made of an insulating material such as alumina. That is, the shield film 17 is connected to the main magnetic pole film P through the yoke film 22 at a position spaced apart from the recording medium facing surface A, whereby the main magnetic pole film P, the shield film 17 and the yoke film 22 form a magnetic path for circulating a magnetic flux corresponding to a magnetic field generated by the coils 21a, 21b.

The overcoat film 23 functions to protect the magnetic head and is, for example, made of a non-magnetic insulating material such as alumina.

3. Perpendicular Recording Magnetic Head Manufacturing Method

Next will be described a manufacturing method of the foregoing perpendicular recording magnetic head. The processes before the process of manufacturing the perpendicular recording magnetic head have been known heretofore and do not require specific description. Roughly speaking, it can be manufactured by stacking a series of components in order by using a conventional thin-film process including a film formation technique such as plating or sputtering, a patterning technique such as photolithography, an etching technique such as dry etching or wet etching, and a polishing technique such as CMP (chemical mechanical polishing).

The outline of the thin-film process will be described with reference to FIGS. 2 to 5, wherein when manufacturing the magnetic head, at first, after the insulating film 2 is formed on the substrate 1, the lower read shield film 3, the shield gap film 4 embedded with the MR element S, and the upper read shield film 5 are stacked on the insulating film 2 in the mentioned order to form the reproducing head R.

Then, after the separating film 6 is formed on the reproducing head R, the magnetic film 7, the insulating films 8, 9, the second coil 21b, the insulating films 10, 12, 11, the first gap film 14, the main magnetic pole film P, the first non-magnetic film 15, the second gap film 16, the yoke film 22, the first layer 17a of the shield film 17, the insulating films 18, 20, the first coil 21a, the insulating film 19, and the second layer 17b of the shield film 17 are stacked on the separating film 6 in the mentioned order to form the recording head W. Finally, after the overcoat film 23 is formed on the recording head W, the air bearing surface A is formed by using a machining process or a polishing process, thereby completing the magnetic head.

In the magnetic head manufacturing process, the perpendicular recording head manufacturing method according to the present invention is applicable to the process of shaping the main magnetic pole film P. Hereinbelow description will be made with reference to FIGS. 7 to 14.

FIGS. 7 to 14 illustrate the process of shaping the main magnetic pole film P. It should be noted that FIGS. 11(a) to 14(a) correspond to FIG. 5, while FIGS. 6 to 9 and FIGS. 11(b) to 14(b) are enlarged views of an area indicated by a symbol G in FIG. 3.

Figure 7:
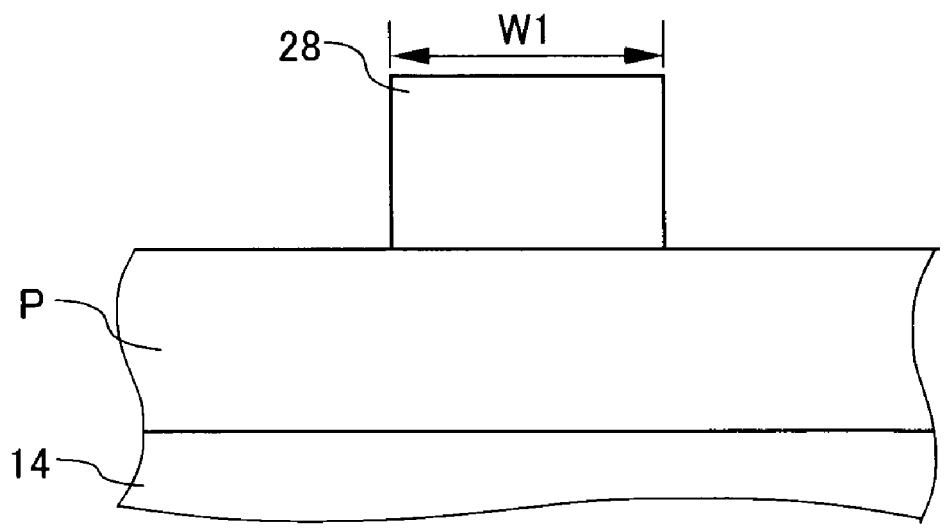
FIG. 7 is a diagram showing a production step of a perpendicular recording magnetic head manufacturing method according to the present invention.

FIGS. 7 to 10 show a magnetic pole layer forming process for forming a magnetic pole layer ML including the main magnetic pole film P and the second non-magnetic film 27 in side-by-side relationship with the main magnetic pole film P. More specifically, at first, the main magnetic pole film P is formed on the previously-formed first gap film 14, for example, with a magnetic material deposited by plating, as shown in FIG. 7. In order to form the recording medium facing surface A into an inverted trapezoidal shape, then, a main magnetic pole forming mask 28 is formed on the main magnetic pole film P, defining the recording track width W1. For example, the main magnetic pole forming mask 28 is formed such that a photoresist layer is formed on the main magnetic pole film P and patterned by photolithography.

Figure 8:
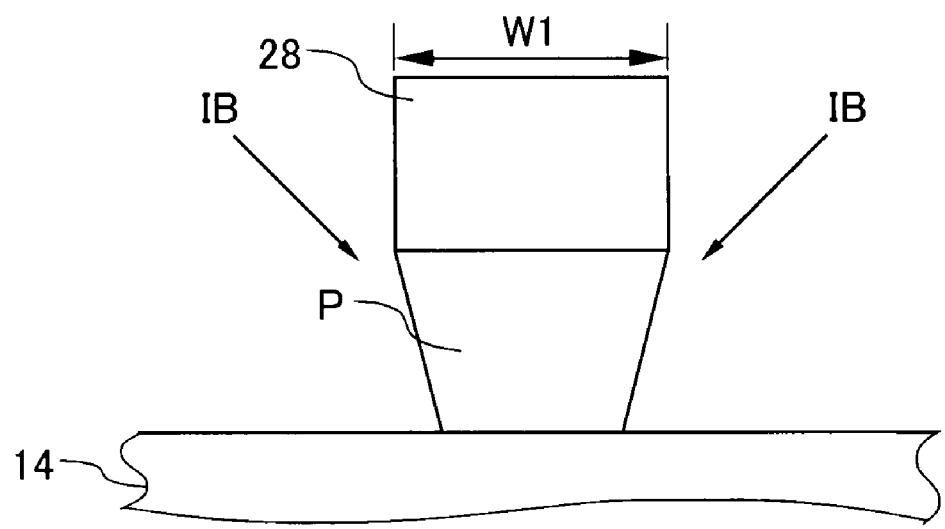
FIG. 8 is a diagram showing a step after the step shown in FIG. 7.

Thereafter, as shown in FIG. 8, the recording medium facing surface A of the main magnetic pole film P is shaped into an inverted trapezoidal shape by ion milling. The ion milling is performed by applying an ion beam IB at a constant angle while oscillating the substrate.

Figure 9:
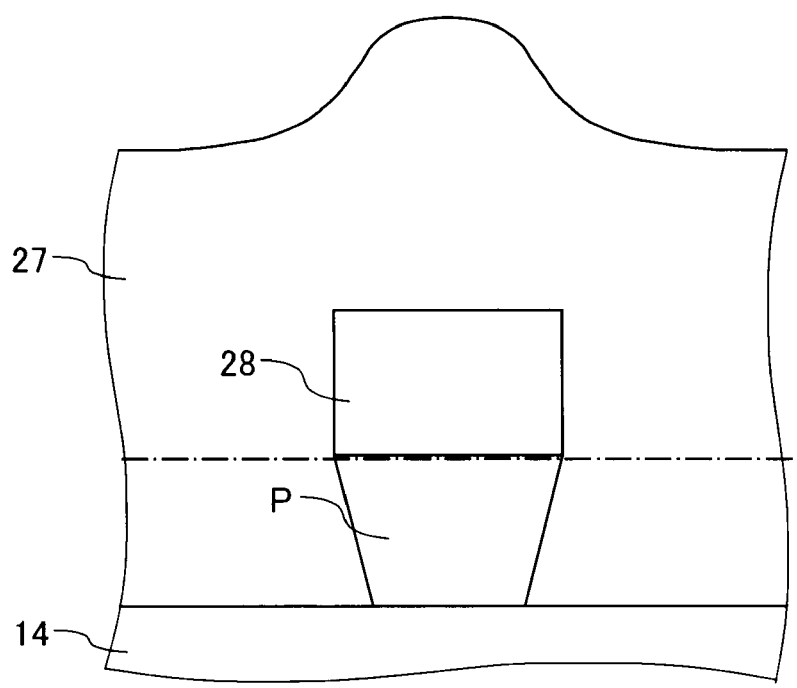
FIG. 9 is a diagram showing a step after the step shown in FIG. 8.
Figure 10:
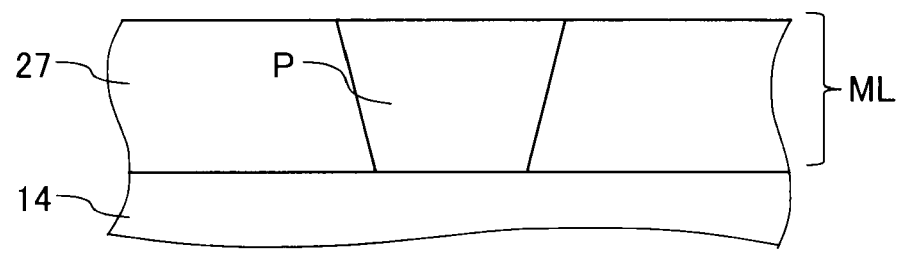
FIG. 10 is a diagram showing a step after the step shown in FIG. 9.

Then, as shown in FIG. 9, the second non-magnetic film 27 is deposited by sputtering or the like to cover the main magnetic pole film P along with the main magnetic pole forming mask 28. Thereafter, the surface of the second non-magnetic film 27 and the surface of the main magnetic pole film P are planarized by CMP until the main magnetic pole film P is exposed (see the dotted line in the figure). Thus, the magnetic pole film ML shown in FIG. 10 can be obtained.

Figure 11A:
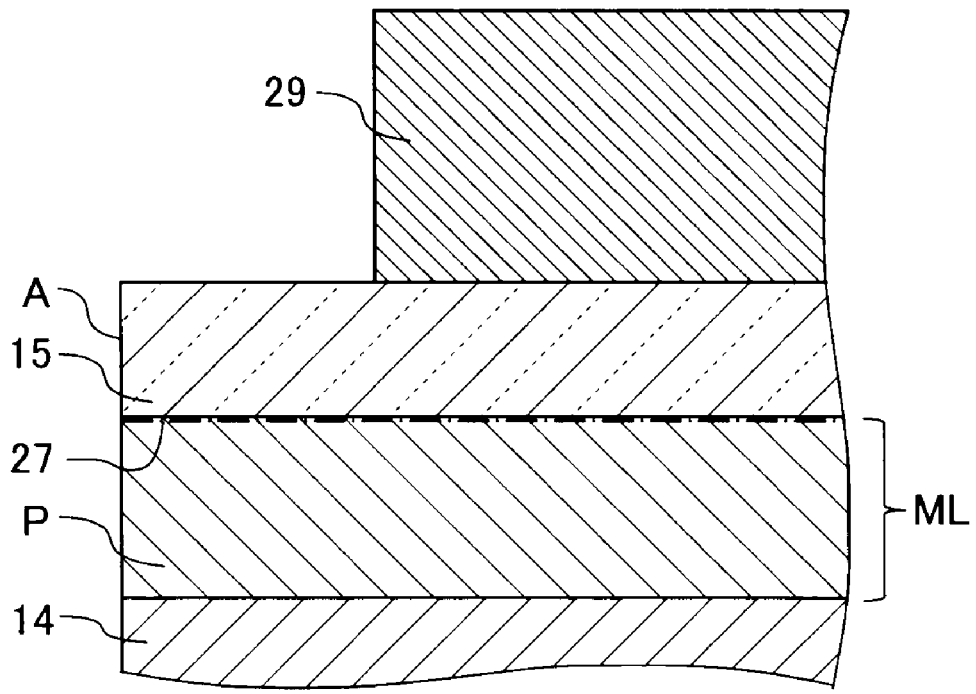
FIGS. 11(a) and 11(b) are diagrams showing a step after the step shown in FIG. 10.
Figure 11B:
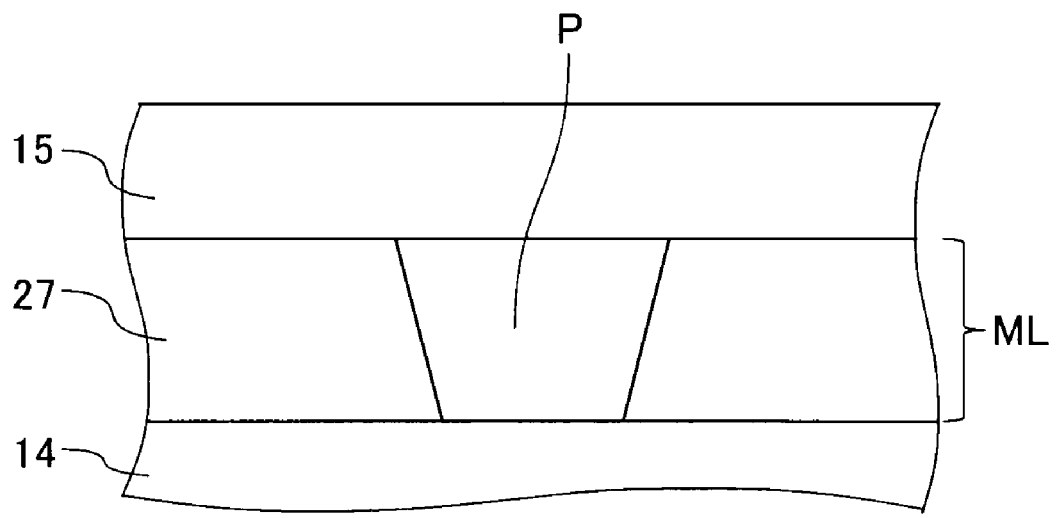
Figure 12A:
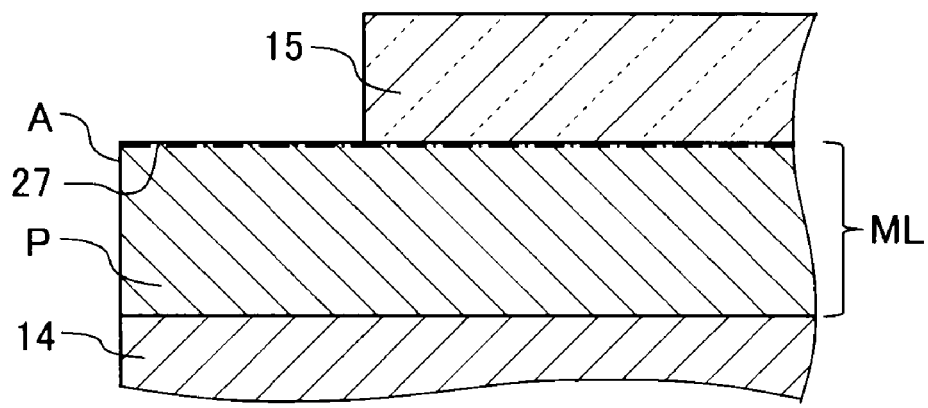
FIGS. 12(a) and 12(b) are diagrams showing a step after the step shown in FIG. 11.
Figure 12B:
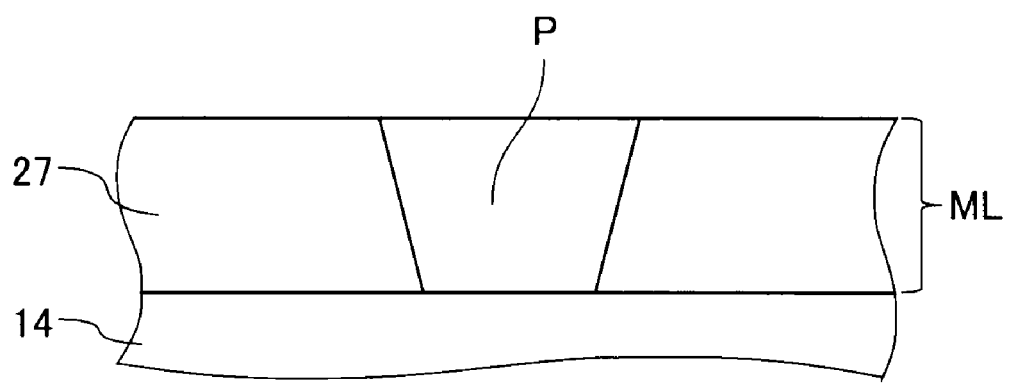

Then, as shown in FIGS. 11(a) and 11(b), the first non-magnetic film 15 is formed on the main magnetic pole film P, for example, by sputtering, and then, an etching mask 29 is formed on the first non-magnetic film 15. For example, the etching mask 29 is formed such that a photoresist layer is formed on the first non-magnetic film 15 and patterned by photolithography. It should be noted that the photoresist layer may be replaced by alumina.

Then, as shown in FIGS. 11(a) and 11(b), the first non-magnetic film 15 is etched by using ion milling, reactive ion etching or the like to remove the portion that is not covered with the etching mask 29. Thus, the first non-magnetic film 15 can be shaped.

The feature of the magnetic head manufacturing method according to the present invention resides in the following preliminary etching step to which the foregoing thin film shaping method is applicable.

Figure 13A:
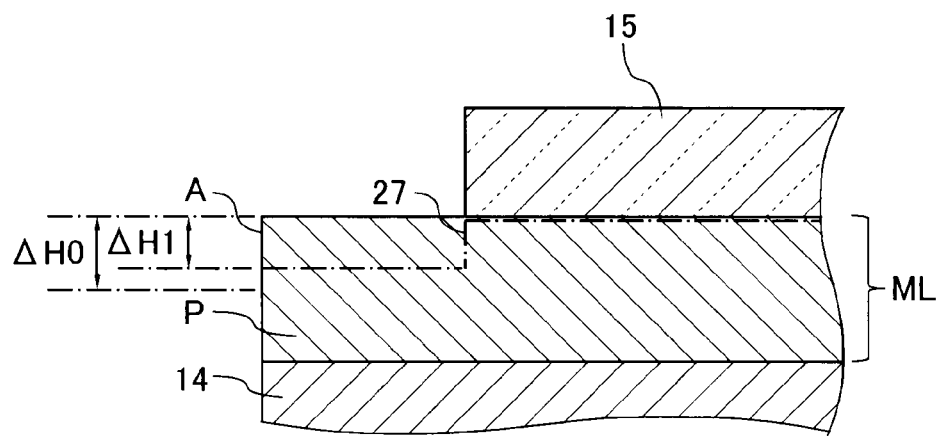
FIGS. 13(a) and 13(b) are diagrams showing a step after the step shown in FIG. 12.
Figure 13B:
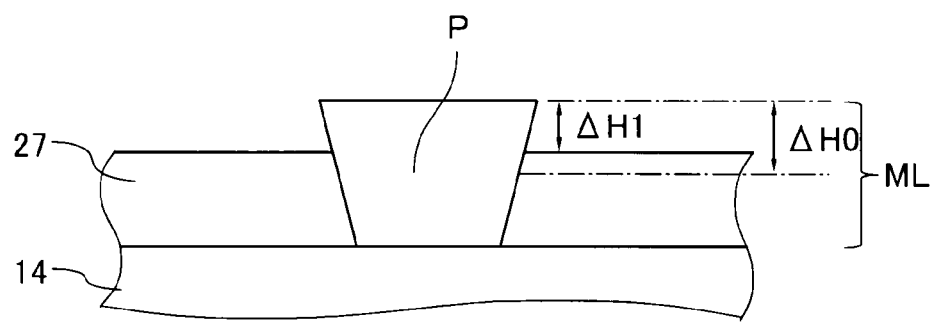

At the preliminary etching step, as shown in FIGS. 13(a) and 13(b), a preliminary etching amount $\Delta H1$ is calculated, based on a required etching amount $\Delta H0$ for shaping the main magnetic pole film P into a given shape, a milling rate $\alpha 1$ of the main magnetic pole film P, and a milling rate $\alpha 2$ of the second non-magnetic film 27, for compensating for a difference between the milling rates $\alpha 1$, $\alpha 2$ to equalize an etching amount of the second non-magnetic film 27 to the required etching amount $\Delta H0$, and only the second non-magnetic film 27 is etched by the preliminary etching amount $\Delta H1$.

In the present embodiment, the required etching amount $\Delta H0$ refers to a milling depth to which the main magnetic pole film P is removed by ion milling when the main magnetic pole film P is formed with the first surface T1, the second surface T2 and the third surface T3 at the following ion milling step. On the other hand, the milling rates $\alpha 1$, $\alpha 2$ refer to milling depths to which the main magnetic pole film P and the second non-magnetic film 27 are removed by ion milling per unit time. Here, the second non-magnetic film 27 is more difficult to mill than the main magnetic pole film P, satisfying the milling rate relation of $\alpha 1 > \alpha 2$.

With the above parameters being applied to the formula 1, the preliminary etching amount $\Delta H1$ is calculated by $$\Delta H1 = \Delta H0 * \{1-(\alpha 2/\alpha 1)\} \quad \text{(formula 2)}.$$

At this preliminary etching step, for example, an alkali etchant that will act only on the second non-magnetic film 27 may be employed, but without being limited thereto, other etching processes such as reactive ion etching may also be employed as long as only the non-magnetic film 27 can be etched by the process without affecting the main magnetic pole film P.

Figure 14A:
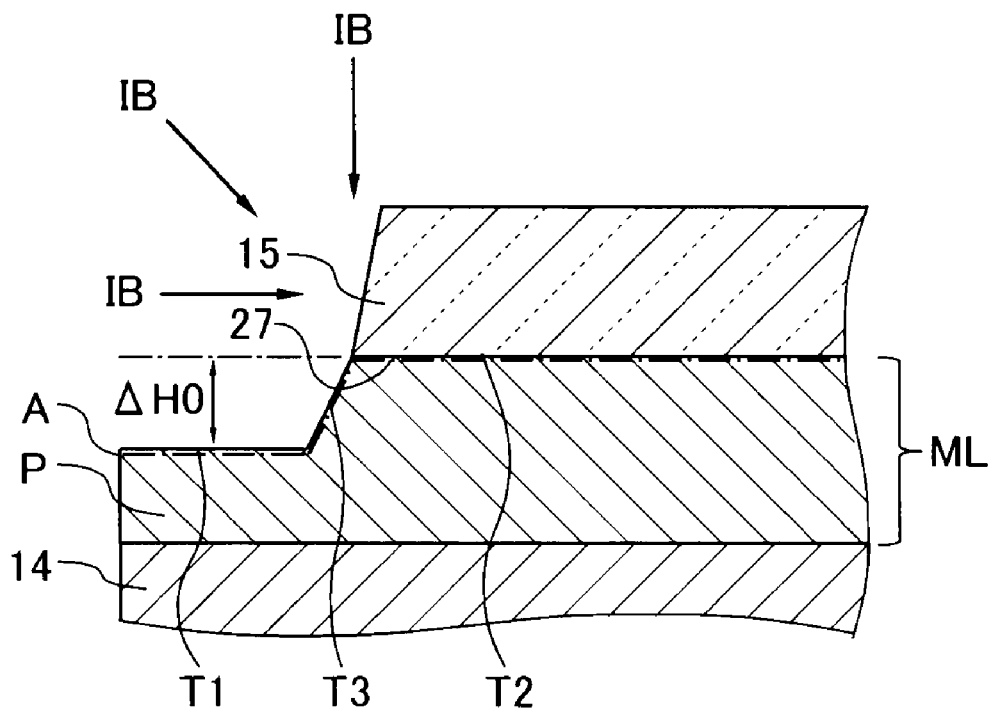
FIGS. 14(a) and 14(b) are diagrams showing a step after the step shown in FIG. 13.
Figure 14B:
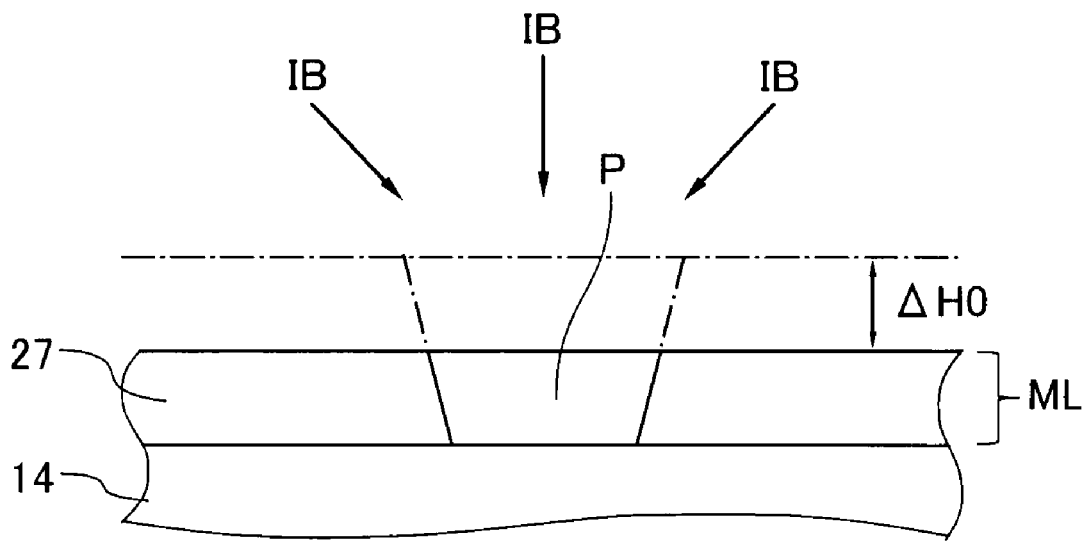

Finally, an ion milling step is performed such that ion milling is performed on the magnetic pole layer ML by the required etching amount ΔH0. At this step, with the first non-magnetic film 15 being used as a mask, the main magnetic pole film P is partially (mainly at the small-width portion Pa) etched by ion milling, as shown in FIGS. 14(a) and 14(b). The ion milling is performed by applying an ion beam IB at a constant angle while oscillating the substrate.

Thus, the main magnetic pole film P can be formed with the first surface T1, the second surface T2 and the third surface T3. At this time, since the main magnetic pole film P is previously made higher than the non-magnetic film 27 by the preliminary etching amount ΔH1 at the preliminary etching step, the ion beam IB is prevented from being blocked by the non-magnetic film 27 of a lower milling rate, and in addition, the height of the main magnetic pole film P and the height of the non-magnetic film 27 at the side of the recording medium facing surface A are reduced by the required etching amount ΔH0, as compared with those at the time of formation. This prevents formation of the foregoing arcuate recess at the trailing side of the recording medium facing surface A of the main magnetic pole film P, whereby the main magnetic pole film P and the first non-magnetic film 15 provide a continuous flat surface.

After the ion milling step, the main magnetic pole film P is planarized by using a polishing process such as CMP. With this, the trailing side of the recording medium facing surface A of the main magnetic pole film P can be planarized with a higher accuracy. It should be noted that necessary post-processes are subsequently performed to obtain the desired thin film magnetic head.

According to this manufacturing method, since the non-magnetic film 27 is preliminarily etched at the preliminary etching step by the preliminary etching amount ΔH1 allowing for the difference between the milling rates α1, α2 of the main magnetic pole film P and the non-magnetic film 27 based on the foregoing formula 2, both the main magnetic pole film P and the non-magnetic film 27 can be etched by the required etching amount ΔH0 through the subsequent ion milling step.

Therefore, since the main magnetic pole film P and the non-magnetic film 27 can be etched by the same amount, the trailing side of the main magnetic pole film P can be planarized.

It should be noted that although the ion milling process is referred to as a typical example hereinabove, it is apparent that the present invention is also applicable to an etching process using other etching methods such as reactive ion etching.

Moreover, although the present embodiment is described with reference to the case where the recording medium facing surface A of the main magnetic pole film P has an inverted trapezoidal shape, the same effect can be of course obtained by applying the present invention also in the case where the recording medium facing surface has an inverted triangular shape.

Furthermore, although the desired etching amount and the preliminary etching amount are determined by an etching depth hereinabove, they are not limited thereto and may also be determined by a volume of a portion to be etched, for example.

The present invention has been described in detail above with reference to preferred embodiments. However, obviously those skilled in the art could easily devise various modifications of the invention based on the technical concepts underlying the invention and teachings disclosed herein.

What is claimed is:

1. A shaping method of a thin film layer, said thin film layer including a first thin film and a second thin film in side-by-side relationship with said first thin film, the method comprising the steps of:
    calculating a preliminary etching amount, based on a required etching amount for shaping said first thin film into a given shape, an etching rate of said first thin film, and an etching rate of said second thin film, said preliminary etching amount compensating for a difference between said etching rates to equalize an etching amount of said second thin film to said required etching amount;
    depositing said second thin film to cover said first thin film;
    planarizing the surface of said second thin film and the surface of said first thin film until said first thin film is exposed;
    etching, after the planarizing step, only said second thin film by said preliminary etching amount; and
    etching, by using ion milling, said thin film layer by said required etching amount to provide a continuous flat surface consisting of the surfaces of said first thin film and said second thin film.

2. The thin film layer shaping method of claim 1, wherein said required etching amount and said preliminary etching amount are determined by an etching depth.

3. The thin film layer shaping method of claim 1, further comprising:
    a step of performing a planarizing process on said first thin film after etching said thin film layer by said required etching amount.

4. A manufacturing method of a perpendicular recording magnetic head, said perpendicular recording magnetic head including a main magnetic pole film and a non-magnetic film in side-by-side relationship with said main magnetic pole film, the method comprising the steps of:
    forming a magnetic pole layer including a main magnetic pole film and a non-magnetic film in side-by-side relationship with said main magnetic pole film;
    calculating a preliminary etching amount, based on a required etching amount for shaping said main magnetic pole film into a given shape, an etching rate of said main magnetic pole film, and an etching rate of said non-magnetic film, said preliminary etching amount compensating for a difference between said etching rates to equalize an etching amount of said non-magnetic film to said required etching amount;
    depositing said non-magnetic film to cover said main magnetic pole film;
    planarizing the surface of said non-magnetic film and the surface of said main magnetic pole film until said main magnetic pole film is exposed;
    etching, after the planarizing step, only said non-magnetic film by said preliminary etching amount; and
    etching, by using ion milling, said magnetic pole layer by said required etching amount to provide a continuous flat surface consisting of the surfaces of said main magnetic pole film and said non-magnetic film.

5. The perpendicular recording magnetic head manufacturing method of claim 4, wherein said non-magnetic film is made of alumina.

6. The perpendicular recording magnetic head manufacturing method of claim 4, wherein said required etching amount and said preliminary etching amount are determined by an etching depth.

7. The perpendicular recording magnetic head manufacturing method of claim 4, wherein ion milling is used for etching said magnetic pole layer by said required etching amount.

8. The perpendicular recording magnetic head manufacturing method of claim 4, wherein reactive ion etching is used for etching only said non-magnetic film by said preliminary etching amount.

9. The perpendicular recording magnetic head manufacturing method of claim 4, wherein an alkali etchant is used for etching only said non-magnetic film by said preliminary etching amount.

10. The perpendicular recording magnetic head manufacturing method of claim 4, further comprising:

step of performing a planarizing process on said main magnetic pole film after etching said magnetic pole layer by said required etching amount.

11. The perpendicular recording magnetic head manufacturing method of claim 4, wherein CMP is used for said planarizing process.

* * * * *